United States Patent
Hirao et al.

(10) Patent No.: US 7,626,910 B2
(45) Date of Patent: Dec. 1, 2009

(54) OPTICAL INFORMATION RECORDING MEDIUM FOR HOLOGRAPHIC RECORDING AND METHOD OF HOLOGRAPHIC RECORDING IN OPTICAL INFORMATION RECORDING MEDIUM

(75) Inventors: Akiko Hirao, Chiba (JP); Hisashi Yamada, Kanagawa (JP); Kazuki Matsumoto, Kanagawa (JP); Hideyuki Nishizawa, Tokyo (JP); Katsutaro Ichihara, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 452 days.

(21) Appl. No.: 10/796,342

(22) Filed: Mar. 10, 2004

(65) Prior Publication Data

US 2004/0179457 A1 Sep. 16, 2004

(30) Foreign Application Priority Data

Mar. 13, 2003 (JP) ............................. 2003-068365

(51) Int. Cl.
*G11B 7/24* (2006.01)
*G09B 7/27* (2006.01)

(52) U.S. Cl. .................. 369/103; 369/275.3; 369/126

(58) Field of Classification Search .............. 369/103, 369/284, 275.3, 44.23, 126, 110.02; 430/270.12, 430/945; 428/64.8; *G11B 7/24*
See application file for complete search history.

(56) References Cited

U.S. PATENT DOCUMENTS

| | | | | |
|---|---|---|---|---|
| 4,856,857 A * | 8/1989 | Takeuchi et al. | .............. | 359/3 |
| 5,064,264 A * | 11/1991 | Ducharme et al. | .......... | 385/130 |
| 5,569,565 A * | 10/1996 | Kawakami et al. | ............ | 430/1 |
| 5,607,799 A * | 3/1997 | Moerner et al. | ............... | 430/1 |
| 5,665,493 A * | 9/1997 | Bai et al. | ....................... | 430/1 |
| 5,725,970 A * | 3/1998 | Martin et al. | .................. | 430/2 |
| 5,800,950 A * | 9/1998 | Hirao et al. | ..................... | 430/1 |
| 5,917,798 A | 6/1999 | Horimai et al. | | |
| 6,280,884 B1 * | 8/2001 | Bjorklund et al. | .............. | 430/1 |
| 6,322,931 B1 * | 11/2001 | Cumpston et al. | ............. | 430/1 |
| 6,600,717 B2 * | 7/2003 | Hayashida et al. | .......... | 369/286 |

(Continued)

FOREIGN PATENT DOCUMENTS

JP          WO99/44195       *    9/1999

(Continued)

OTHER PUBLICATIONS

Coufal, H. J. et al., "Holographic Data Storage", Springer, Berlin, pp. 101-111, pp. 171-197, pp. 199-208, (2000).

(Continued)

*Primary Examiner*—Hoa T Nguyen
*Assistant Examiner*—Kim-Kwok Chu
(74) *Attorney, Agent, or Firm*—Finnegan, Henderson, Farabow, Garrett & Dunner, L.L.P.

(57) ABSTRACT

The optical information recording medium according to the present invention includes a transparent substrate having a first surface and a second surface, a recording layer that is arranged on the first surface of the transparent substrate, and a reflection layer arranged on the second surface of the transparent substrate. A hologram is recorded in the recording layer when a signal light and a reference light are incident from an incident side opposite to the transparent substrate. An optical density of the recording layer corresponding to the signal light decreases from the incident side toward the transparent substrate.

16 Claims, 7 Drawing Sheets

U.S. PATENT DOCUMENTS

| | | | |
|---|---|---|---|
| 6,738,322 B2 * | 5/2004 | Amble et al. | 369/44.27 |
| 6,864,019 B2 * | 3/2005 | Hegel et al. | 430/1 |
| 7,018,744 B2 * | 3/2006 | Otaki et al. | 430/1 |
| 7,060,393 B2 * | 6/2006 | Tsukamoto et al. | 430/1 |
| 7,067,230 B2 * | 6/2006 | Cammack et al. | 430/270.1 |
| 7,130,092 B1 * | 10/2006 | Horimai | 359/35 |
| 7,313,072 B2 * | 12/2007 | Tsukagoshi | 369/103 |
| 2003/0049543 A1 * | 3/2003 | Elliott et al. | |
| 2004/0180266 A1 | 9/2004 | Hirao et al. | |

FOREIGN PATENT DOCUMENTS

JP    2002-123949    4/2002

OTHER PUBLICATIONS

U.S. Appl. No. 10/773,323, filed Feb. 9, 2004, to Matsumoto et al.

* cited by examiner

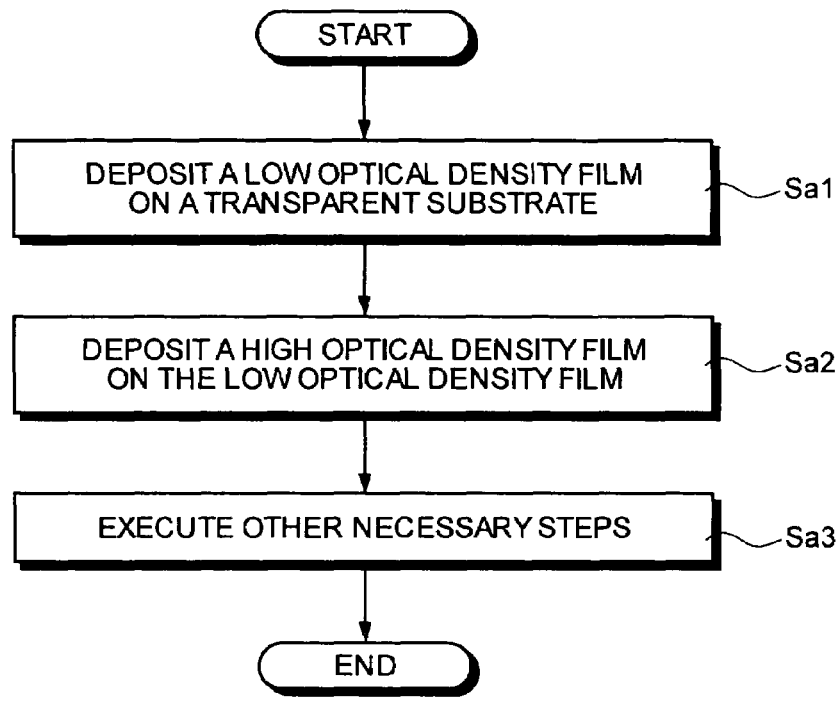
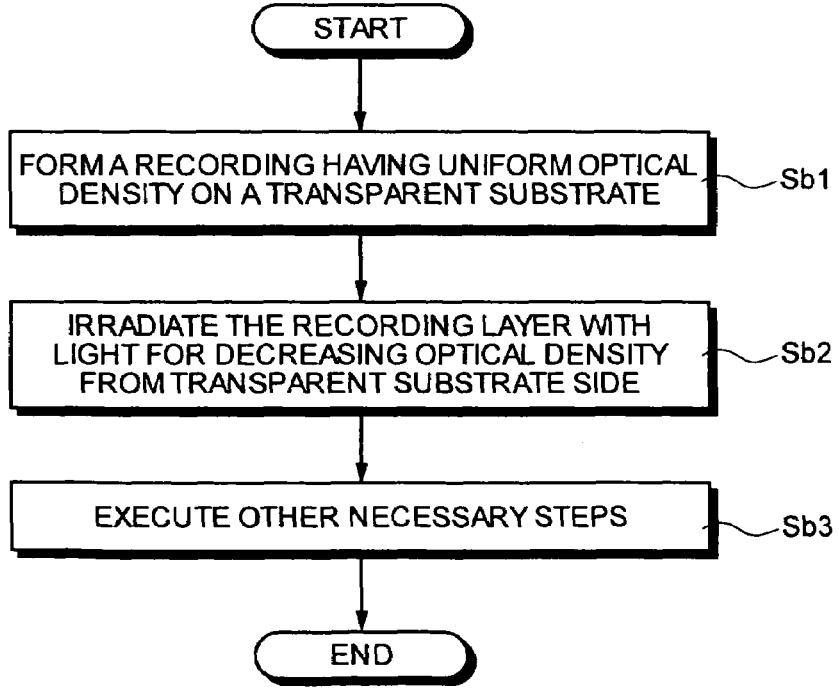

OPTICAL INFORMATION RECORDING MEDIUM FOR HOLOGRAPHIC RECORDING AND METHOD OF HOLOGRAPHIC RECORDING IN OPTICAL INFORMATION RECORDING MEDIUM

CROSS-REFERENCE TO RELATED APPLICATIONS

This application is based upon and claims the benefit of priority from the prior Japanese Patent Applications No. 2003-068365 filed on Mar. 13, 2003; the entire contents of which are incorporated herein by reference.

BACKGROUND OF THE INVENTION

1) Field of the Invention

The present invention relates to an optical information recording medium on which holographic recording is performed by irradiating a signal light and a reference light, a method of recording information on the optical information recording medium, and a method of manufacturing the optical information recording medium.

2) Description of the Related Art

Compared with a conventional surface recording technology such as magneto-optical recording or phase change optical recording on an optical disk, a holographic recording is gaining an attention because of its ability to implement a high-density, high-capacity, and high-speed recording. One of the holographic recording type medium is a holographic storage, which is described in, for example, H. J. Coufal: Holographic Data Storage, Springer, Berlin, p. 101-111, p 171-197, p 199-208, 2000.

The conventional recording method for the holographic storage must cope with a vibration problem in an optical system to get a stable recording of an optical interference pattern. Therefore, high precision mechanical components and positioning mechanism are required, and since the recording is based on a two-beam interference method, it is difficult to make a size of the optical system compact. Furthermore, since a recording medium to be used is required to be an optically flat disk substrate material, the recording medium lacks of the concept of address, and as a result, the recording medium is incomplete as a rewritable medium. Besides, the recording medium is incompatible with an existing optical disk.

As a new recording method intended to solve the problems described above, a polarized collinear holographic method is proposed. The method is disclosed in, for example, Japanese Patent Application Laid-Open No. 2002-123949. An optical recording medium having a reflection layer provided on its rear surface is employed, and a reference light and a signal light are coaxially incident on an optical path. In other words, input and output of an information are performed coaxially in the same direction. This makes a mechanical control required for recording easy, and since tracking servo control is exerted to read address information based on information preformatted on the optical recording medium, it is possible to make a random access to the medium.

However, if the optical recording medium conventionally used for the polarized collinear holographic recording is employed, an efficient recording cannot be ensured without an aid of a high power laser for recording. As a result, an intensity of a read light is low and a sufficiently high signal-to-noise-ratio (SNR) cannot be obtained. To make use of a performance of the recording medium, to record information using a lower power laser and obtain a high-intensity read light at a higher SNR during reading operation, a medium design considering an energy density of the signal light is required. Unfortunately, such a recording medium has not yet been achieved.

SUMMARY OF THE INVENTION

It is an object of the present invention to solve at least the problems in the conventional technology.

The optical information recording medium according to one aspect of the present invention includes a transparent substrate having a first surface and a second surface, a recording layer that is arranged on the first surface of the transparent substrate, and a reflection layer arranged on the second surface of the transparent substrate. A hologram is recorded in the recording layer when a signal light and a reference light are incident from an incident side opposite to the transparent substrate. An optical density of the recording layer corresponding to the signal light decreases from the incident side toward the transparent substrate toward the transparent substrate. A reflection layer is arranged on the second surface of the transparent substrate.

The method of manufacturing an optical information recording medium, which includes a recording layer in which a hologram is recorded and a transparent substrate that has a first surface and a second surface, according to another aspect of the present invention includes depositing the recording layer on the first surface of the transparent substrate, and irradiating a light to decrease an optical density on the recording layer from a side of the second surface of the transparent substrate.

The method of manufacturing an optical information recording medium, which includes a recording layer in which a hologram is recorded and a transparent substrate, according to still another aspect of the present invention includes depositing the recording layer on a surface of the transparent substrate, and doping a sensitizer into the recording layer from a light incident side.

The method of recording information in an optical information recording medium, which includes a transparent substrate having a first surface and a second surface, a recording layer that is arranged on the first surface of the transparent substrate, and a reflection layer arranged on the second surface of the transparent substrate, according to still another aspect of the present invention includes recording the hologram in the recording layer by irradiating the optical information recording medium with the signal light and the reference light through a lens. A hologram is recorded in the recording layer when a signal light and a reference light are incident from an incident side opposite to the transparent substrate. An optical density $S(z)$ at a depth $z$ in the recording layer corresponding to the signal light decreases from the incident side toward the transparent substrate, within a range expressed as $$0.5 \times \frac{S_0}{r_0^2} \left( r_0 - \frac{\frac{A}{n_1}}{\sqrt{1-\left(\frac{A}{n_1}\right)^2}} z \right)^2 \leq \quad (1)$$

-continued $$S(z) \leq 2.0 \times \frac{S_0}{r_0^2}\left(r_0 - \frac{\frac{A}{n_1}}{\sqrt{1-\left(\frac{A}{n_1}\right)^2}}z\right)^2$$

where $S_0$ is the optical density on a surface of the incident side of the recording layer at $z=0$, $n_1$ is a refractive index of the recording layer, $A$ is a numerical aperture of the lens, $r_0$ is a radius of a spot of the signal light on the surface of the incident side, and $z$ is a distance from the surface of the incident side into the recording layer.

The method of recording information in an optical information recording medium, which includes a transparent substrate having a first surface and a second surface, a recording layer that is arranged on the first surface of the transparent substrate, a reflection layer arranged on the second surface of the transparent substrate, and a groove that is arranged on the second surface of the transparent substrate to form a track, according to still another aspect of the present invention includes recording the hologram in the recording layer by irradiating the optical information recording medium with the signal light and the reference light through a lens. A hologram is recorded in the recording layer when a signal light and a reference light are incident from an incident side opposite to the transparent substrate. An optical density $S(r, z)$ at a predetermined position in the recording layer corresponding to the signal light decreases from the incident side toward the transparent substrate, within a range expressed as $$0.5 \times \frac{S_0}{r_0^2}\left(r_0 - \frac{\frac{A}{n_1}}{\sqrt{1-\left(\frac{A}{n_1}\right)^2}}z\right)^2 \exp\left(\frac{2r^2}{r_0^2}\right) \leq \quad (2)$$

$$S(r, z) \leq 2.0 \times \frac{S_0}{r_0^2}\left(r_0 - \frac{\frac{A}{n_1}}{\sqrt{1-\left(\frac{A}{n_1}\right)^2}}z\right)^2 \exp\left(\frac{2r^2}{r_0^2}\right)$$

where $S_0$ is the optical density of a center of a spot of the signal light at $r=0$ on a surface of the incident side of the recording layer at $z=0$, $n_1$ is a refractive index of the recording layer, $A$ is a numerical aperture of the lens, $r_0$ is a radius of the spot of the signal light on the surface of the incident side, $r$ is a distance from the center of the spot in a direction across the track, and $z$ is a distance from the surface of the incident side into the recording layer The other objects, features and advantages of the present invention will become apparent from the following detailed description with reference to the accompanying drawings.

BRIEF DESCRIPTION OF THE DRAWINGS

FIG. 5 is a flowchart of an example of procedures for a method of manufacturing the optical information recording medium according to the embodiment;

FIG. 6 is a flowchart of another example of procedures for the method of manufacturing the optical information recording medium according to the embodiment;

DETAILED DESCRIPTIONS

Figure 1:
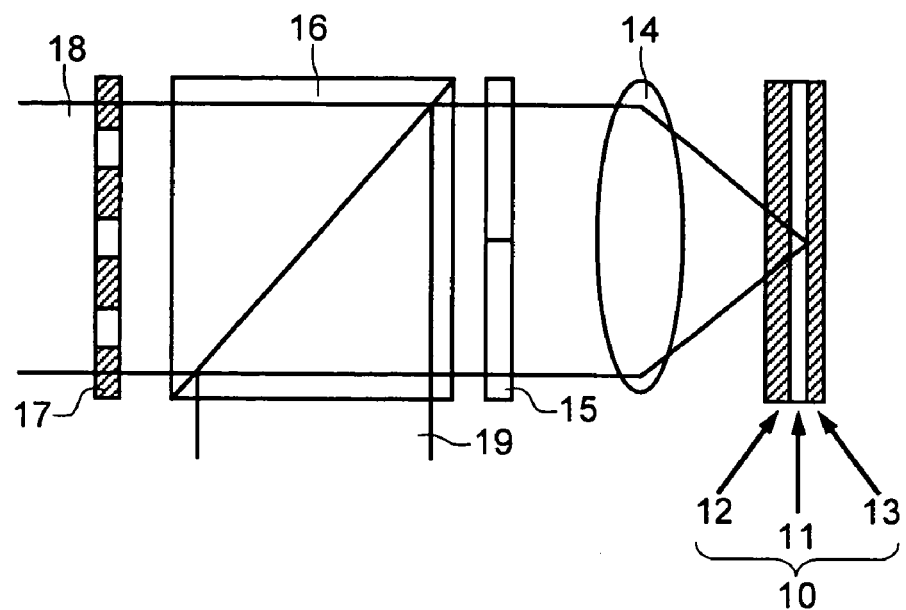
FIG. 1 is a schematic diagram of a pickup section that optically records information based on a polarized collinear holographic method and a neighborhood of the pickup section.

Exemplary embodiments of an optical information recording medium, a method of recording information, and a method of manufacturing the optical information recording medium according to the present invention are explained with reference to the accompanying drawings.

As a result of extensive studies, inventors of the present application found out that the reason that optical information is recorded inefficiently if the conventional polarized collinear holographic method is used as follows.

For a recording layer in the conventional optical information recording medium, various types of materials including photopolymers, photorefractive polymers, photorefractive crystals, and a photochromic film can be used. With the medium including the recording layer made of any one of these materials, an optical density of a signal light in a depth direction of the recording layer is uniform.

According to the polarized collinear holographic method, a region in the recording layer in which region a hologram is recorded is conical. For this reason, an energy density of the recording medium gradually increases from an incident side toward a reflection layer side (opposite to the incident side). Accordingly, an intensity of a refractive index modulation to be recorded gradually increases from the incident side toward the reflection layer side, as well. This is because the recording layer having the uniform optical density has also a uniform sensitivity and information is recorded in the recording layer in accordance with the energy density of the signal light. If such recording is performed, a high power laser must be employed as a light source because of an inferior light utilization efficiency of the optical information recording medium.

Considering the disadvantage as well as the energy density of the signal light in the depth direction of the recording layer, the inventors discovered the following respects and achieved the present invention.

If it is assumed that a region such as a film or a space having a different refractive index from that of the recording layer is present above the recording layer and that the signal light cannot be absorbed by the recording layer, then a light intensity I of the signal light is inversely proportional to a cross-sectional area of a beam at a depth z (in micrometers) of the recording layer. If the signal light is incident on the recording layer using a lens having a numerical aperture of A, the light intensity I of the signal light in the recording layer is expressed as:

$$I = I_0 \frac{r_0^2}{\left(r_0 - \frac{\frac{A}{n_1}}{\sqrt{1 - \left(\frac{A}{n_1}\right)^2}} z\right)^2} \quad (3)$$

where symbol $I_0$ is a light intensity on an incident surface (z=0) of the recording layer, $n_1$ is a refractive index of the recording layer, and $r_0$ is a radius (in micrometers) of a spot size of the signal light on the incident surface of the recording layer.)

It is assumed herein that no light is absorbed by the recording layer. If multiplexing recording is not performed, the optical density of the recording layer is ideally a reciprocal of this light intensity distribution.

Therefore, the optical density of the recording layer is expressed as:

$$S(z) = \frac{S_0}{r_0^2} \left(r_0 - \frac{\frac{A}{n_1}}{\sqrt{1 - \left(\frac{A}{n_1}\right)^2}} z\right)^2 \quad (4)$$

In actuality, shift-multiplexing recording is performed in the recording layer. It is, therefore, necessary to set the optical density also in light of the shift-multiplexing recording. If optical information is recorded while shifting a recording area in a surface direction of the medium, multiplexing recording is performed by a number of times obtained by dividing the beam diameter by a shift length. Since the signal light is incident on the recording layer after being narrowed down, the beam diameter of the signal light in an upper portion of the recording layer is larger than that in a lower portion thereof.

Taking this into consideration, it is preferable that the optical density of the recording layer in the upper portion changes more gently than that expressed by Eq. (4). For example, if the radius of the beam on a lower surface of the recording layer (a substrate side surface) is 0.7 times as large as that on an upper surface of the recording layer (incident surface), a multiplexing degree of the lower surface of the recording layer is a half of that of the upper surface. Taking this also into consideration, it is more preferable that the optical density of the recording layer in the lower portion is a two-fold of a value obtained as a reciprocal of the optical beam intensity distribution.

As a result of the experiment, the inventors have reached the conclusion that optical information can be recorded using a lower power laser by changing the optical density S (z) at the dept z (micrometers) of the recording layer within a range expressed as:

$$0.5 \times \frac{S_0}{r_0^2} \left(r_0 - \frac{\frac{A}{n_1}}{\sqrt{1 - \left(\frac{A}{n_1}\right)^2}} z\right)^2 \leq \quad (5)$$

$$S(z) \leq 2.0 \times \frac{S_0}{r_0^2} \left(r_0 - \frac{\frac{A}{n_1}}{\sqrt{1 - \left(\frac{A}{n_1}\right)^2}} z\right)^2$$

where, symbol $S_0$ is the optical density on the incident surface (z=0) of the recording layer, $n_1$ is the refractive index of the recording layer, A is a numerical aperture of a lens, $r_0$ is a radius (in micrometers) of a spot size of the signal light on the incident surface of the recording layer, and z is a distance (in micrometers) from the incident surface of the recording layer.)

If a substrate having grooves each specifying a track is employed for the optical information recording medium, the optical density of the recording layer needs to have an appropriate recording distribution not only in the depth direction but also in plane direction. Therefore, the optical density of the recording layer is within a range expressed by following relation (6) as a function between the depth z (in micrometers) from the incident surface and a distance r (in micrometers) from a center of the signal light beam.

$$0.5 \times \frac{S_0}{r_0^2} \left(r_0 - \frac{\frac{A}{n_1}}{\sqrt{1 - \left(\frac{A}{n_1}\right)^2}} z\right)^2 \exp\left(\frac{2r^2}{r_0^2}\right) \leq \quad (6)$$

$$S(r, z) \leq 2.0 \times \frac{S_0}{r_0^2} \left(r_0 - \frac{\frac{A}{n_1}}{\sqrt{1 - \left(\frac{A}{n_1}\right)^2}} z\right)^2 \exp\left(\frac{2r^2}{r_0^2}\right)$$

where, symbol $S_0$ is the optical density at the center (r=0) of the beam spot on the incident surface (z=0) of the recording layer, $n_1$ is the refractive index of the recording layer, A is the numerical aperture of the lens, r is the distance (in micrometers) from the center of the optical beam of the signal light, $r_0$ is the radius of the spot size (in micrometers) of the signal light on the incident surface of the recording layer, and z is the distance (in micrometers) from the incident surface of the recording layer.)

In the embodiments of the present invention, the optical density of the recording layer for the signal light gradually decreases from the incident side toward the transparent substrate side. Therefore, optical information can be recorded using the lower power laser while making effective use of the optical energy.

The optical density of the recording layer preferably holds the relationships as expressed by the above relations. However, if the optical density of the recording layer on the incident side is high and the optical density on the transparent substrate side is lower than the optical density on the incident side, it is considered that optical information can be recorded using a lower power laser than that used for the medium in which the recording layer having the uniform optical density is formed. In this case, even if the optical density of a part of the recording layer on the incident side is higher than that of a part thereof on the transparent substrate side, it is considered that optical information can be recorded with a lower laser power than that for the medium in which the recording layer having the uniform optical density is formed.

In all the cases, the optical density of the recording medium may decrease continuously or stepwise from the light incident side toward the transparent substrate.

The present invention has been achieved according to such a principle. The embodiments will be explained hereinafter. In the embodiments of the present invention, a transparent substrate such as a transparent glass substrate or a transparent plastic substrate is used as a substrate. A thickness of the substrate can be appropriately selected based on an intensity of the signal light, a sensitivity of the recording layer, a diffraction efficiency of the recording layer, a multiplexing method, a sensitivity of a detector, a numerical aperture of a lens, and the like. If the lens having a numerical aperture 0.6, for example, is used, the thickness of the substrate is about 200 to 800 micrometers.

The recording layer in the optical information recording medium in the embodiments of the present invention can be formed out of arbitrary one of materials capable of recording interference fringes. The materials involve, for example, inorganic crystals exhibiting a photorefractive effect such as $LiNbO_3$, $LiTaO_3$, $BaTiO_3$, $Ba_{1-x}Ca_xTiO_3$, $KnbO_3$, $KTa_{1-x}Nb_xO_3$(KTN), $Ba_2NaNb_5O_{12}$, $Sr_{1-x}Ba_xNb_2O_6$ (SBN), $Bi_{12}TiO_{20}$ (BTO), $Bi_{12}SiO_{20}$ (BSO), $Bi_{12}GeO_{20}$(BGO), GaAs, and lnP. A photorefractive polymer may be used. A liquid crystal doped photorefractive medium can be formed out of a photopolymer, a photochromic material, or a photoaddressable material.

If the photorefractive polymer is used to form the recording layer, the optical information recording medium in the embodiments according to the present invention can be manufactured by evaporating a solvent of a solution containing a charge transport material, a charge generation material, and a nonlinear optical material. Each of the components may be either molecules or a polymer as long as it exhibits the photorefractive effect. Alternatively, the optical information recording medium may be manufactured by, for example, quenching a heated mixture without using the solvent.

The charge generation material generates charges after absorbing the signal light, so that the material needs to absorb the signal light. However, if the charge generation material having a very high optical density for the signal light is used, the signal light sometimes fails to reach the charge generation material contained in the recording layer. Preferably, therefore, the optical density (in $cm^{-1}$) of the recording layer is in a range of $10^{-6}$ to 10.

Examples of the charge generation material include metal phthalocyanine and nonmetal phthalocyanine as well as phthalocyanine coloring matters/pigments and naphthalocyanine coloring matters/pigments such as derivatives of the metal phthalocyanine and nonmetal phthalocyanine, azo-based coloring matters/pigments such as monoazo, disazo, and trisazo, perylene-based dyes/pigments, indigo-based dyes/pigments, quinacridon dyes/pigments, polycyclic chinone-based dyes/pigments such as anthraquinone and anthanthrone, cyanine-based dyes/pigments, charge transfer complexes, represented by TTF-TCNQ, each consisting of an electron acceptor and an electron donor, azulenium salts, and fullerenes represented by $C_{60}$ and $C_{70}$ as well as methanofullerene, derivatives of fullerenes.

The charge transport material is a material having a charge transport ability of transporting holes or electrons and may be molecules, a polymer or a copolymer with the other polymer. Examples of the charge transport material include nitrogen-containing cyclic compounds such as indole, carbazole, oxazole, ioxazole, thiazole, imidazole, pyrazole, oxyadiazole, pyrazoline, thiadiazole, and triazole as well as derivatives thereof, compounds containing the nitrogen-containing cyclic compound in a main chain or a side chain, hydrazone compounds, triphenyl amines, triphenylmethans, and butadienes, stilbenes, chinone compounds such as anthraquinone and diphenoquinone as well as derivatives thereof and compounds containing the chinone compound in a main chain or a side chain, fullerenes represented by $C_{60}$ and $C_{70}$ and derivatives thereof. They also include π conjugate polymers and oligomers such as polyacetylene, polypyrrole, polythiophene, and polyaniline, and σ conjugate polymers and oligomers such as poly-silane and polygermane, and polycyclic aromatic compounds such as oligomer, anthracene, pyrene, phenanthrene, and coronene.

Alternatively, the recording layer may be formed using a photopolymer. The photopolymer polymerize when being irradiated with the signal light and thereby records interference fringes. Normally, the photopolymer contains a matrix material, a monomer, and an initiator. Further, the photopolymer which also contains an acid generator, a radical generator, a coloring matter, an oligomer, or a reaction inhibitor may be used.

Examples of the matrix material include various vinyl polymers such as polyvinyl acetate including an ester group, polycarbonate, polyarylate, norbornene-based resin, polymethyl methacrylate, cellulose acetate butylate, and polystyrene methyl methacrylate. A content of the matrix material in the photopolymer can be set at about 20 to 80 wt %.

As the monomer, a monomer containing an acrylate group is preferable. Examples of the monomer include chlorinated monomers such as isobornyl acrylate, phenoxy ethyl acrylate, diethyl glycol monoethyl ether acrylate, ethyl acrylate, vinyl benzoate, and vinyl naphthoate, and monomers assigned various substituents such as Si-containing group so as to increase the refractive index difference. The monomer may be used solely or a mixture of two or more monomers may be used. Examples of the mixture include (trimethyl-silyloxy) dimethyl silyl propyl acrylate and (perfluorocyclohexyl) methyl acrylate. The monomer often contains N-vinyl carbazole. A content of the monomer in the photopolymer can be set at about 5 to 50 wt %.

The initiator is a compound that absorbs light and initiates a polymerization reaction, typically bis (2,6-difluoro-3-pyrrole phenyl) titanocene. A content of the initiator can be appropriately selected according to a wavelength of the signal light, a thickness of the recording layer, and an amount of light absorbed of the initiator and may be set at about 0.1 to 5.0 wt %.

Examples of the acid generator include an aryldiazonium salt, diaryliodonium salt, a triarylsulfonium salt, a triarylselenonium salt, a dialkylphenacylsulfonium salt, a dialkyl-4-hydroxyphenylsulfonium salt, a sulfonic ester, and an iron arene compound. Examples of the radical generator include aromatic carbonyl compounds, particularly, α, α-dimethoxy-α-phenylacetophenone. Examples of the coloring matter include azido compounds, 5-nitro-acenaphthene, 1,2-benzanthraquinone, 1-nitro-4-acetylamino naphthalene, methylene blue, malachite green, cyanine dye, and rhodamine dye. As the oligomer, polyfunctional acrylate resin, epoxy resin or the like having reaction groups on both ends of a main chain of the polymer can be used. Examples of the reaction inhibitor include a radical deactivator such as oxygen, a radical scavenger such as butylated hydroxyanisole, N-tert-butyl-α-phenylnitrone (PBN), and polyphenyl compounds, and peroxides such as a tert-butyl hidroperoxide.

The oxygen generator, the radical generator, the coloring matter, the oligomer, or the reaction inhibitor can produce an effect if a content of the component in the photopolymer is about 0.1 wt %. However, if the component is contained too excessively, the sensitivity of the recording layer is possibly be deteriorated. It is, therefore, preferable that the content of the component is at most about 1 wt %.

Whatever the composition of the recording layer is, the thickness of the recording layer can be appropriately selected according to the thickness of the substrate, the numerical aperture of the lens, the sensitivity of the recording layer, the diffraction efficiency of the recording layer, the optical density of the recording layer, the multiplexing recording method, the sensitivity of the detector and the like. If the numerical aperture of the lens is 0.6 and the thickness of the substrate is 0.6 millimeters, for example, the thickness of the recording layer is about 100 to 500 micrometers.

Referring to FIG. 1, holographic recording based on the polarized collinear holography method performed using the optical information recording medium in the embodiments of the present invention will be explained. In an optical information recording medium 10, a transparent substrate 11 includes two surfaces facing each other, a recording layer 12 is formed on the incident-side surface, and a reflection layer 13 is formed on the surface opposite to the incident-side surface.

As materials for the transparent substrate 11 and the recording layer 12, those already explained are used. The reflection layer 13 is preferably made of a thin film material that exhibits a total reflection property for an operating wavelength. If the operating wavelength is 400 to 780 nanometers, an Al alloy or an Ag alloy is a preferable material for the reflection layer 13. If the operating wavelength is 650 nanometers or more, the Al alloy, the Ag alloy, Au, a Cu alloy, TiN or the like is preferable. The reflection layer 13 has such a thickness as to exhibit the total reflection property, i.e., preferably 50 nanometers or more, more preferably 100 nanometers or more.

As shown in FIG. 1, a signal light 18 and a reference light 19 are incident on an optical path coaxially through a spatial light modulator 17 and directly, respectively. By making the signal light 18 and the reference light 19 interfere with each other in the recording layer 12 using a polarized beam splitter 16, a gyrator 15, and a lens 14, a hologram is formed. A light diffracted on the recorded hologram is detected as a read light.

Figure 2:
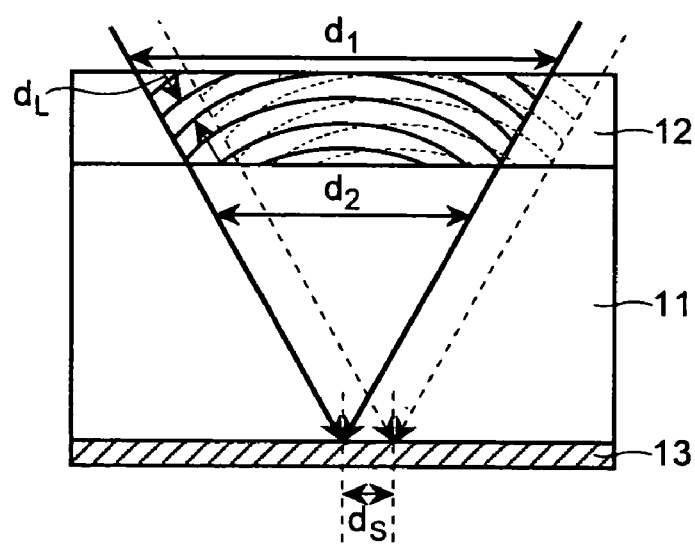
FIG. 2 is a schematic diagram of a state in which a signal light is irradiated onto an optical information recording medium according to an embodiment of the present invention.

As shown in FIG. 2, the optical information recording medium 10 is irradiated with a light having such a profile that a conical light is cut crosswise. If the signal light is converged on and reflected by the reflection layer 13, a diameter d1 of a signal light spot on an uppermost surface (incident surface) of the recording layer 12 is different from a diameter d2 of a signal light spot on a lowermost surface (substrate-side surface) of the recording layer 12. A symbol dL in the recording layer 12 denotes a distance between gratings.

If the thickness of the transparent substrate 11 is 600 micrometers and that of the recording layer 12 is 200 micrometers, the diameter d1 of the signal light spot on the incident surface is 1200 micrometers and the diameter d2 of the signal light spot on the substrate-side surface is 900 micrometers. Accordingly, an optical energy density on the substrate-side surface of the recording layer 12 is about 1.8 times as high as that on the incident surface. If shift multiplexing is performed at the shift distance (ds) of 10 micrometers, 90 multiplexing is performed in a portion irradiated with a center of the signal light beam on the substrate-side surface of the recording layer 12.

On the other hand, 120 multiplexing is performed in a portion irradiated with the center of the signal light beam on the incident surface of the recording layer 12. At this time, if the number of irradiated photons on the substrate-side surface is compared with that on the incident surface while photons absorbed by the optical recording medium are ignored, the number of photons irradiated with the substrate-side surface of the recording layer 12 is about 1.35 times as large as that on the incident surface thereof. As explained above, by setting the optical density of the recording layer 12 on the incident surface higher than that on the substrate-side surface by about 1.35 times, the difference in the number of irradiated photons therebetween can be effectively utilized.

If the substrate having grooves each specifying a track is used, it is preferable to consider not only the depth direction of the recording layer 12 but also the optical density of the recording layer 12 in the plane. In other words, if the substrate including the grooves is used, it is preferable to consider setting portions of the recording layer 12 to have different optical densities according to their positions even though they are equal in distance (equal in depth) from the reflection layer 13.

It is assumed that a circular signal light beam is scanned on the optical recording medium. In this instance, the signal light is irradiated onto an upper portion of the groove irradiated with the center of the signal light while the signal light beam is moving by a distance corresponding to the diameter of the beam. The time for which the signal light is irradiated onto a peripheral portion of the groove is shorter than the time for which the signal light is irradiated onto the upper portion of the groove. Under these conditions, 120 multiplexing is performed in the portion, irradiated with the center of the signal light beam, of the incident surface of recording layer 12 whereas about 84 multiplexing is performed in a portion away from the center of the beam by 42 micrometers.

Figure 3:
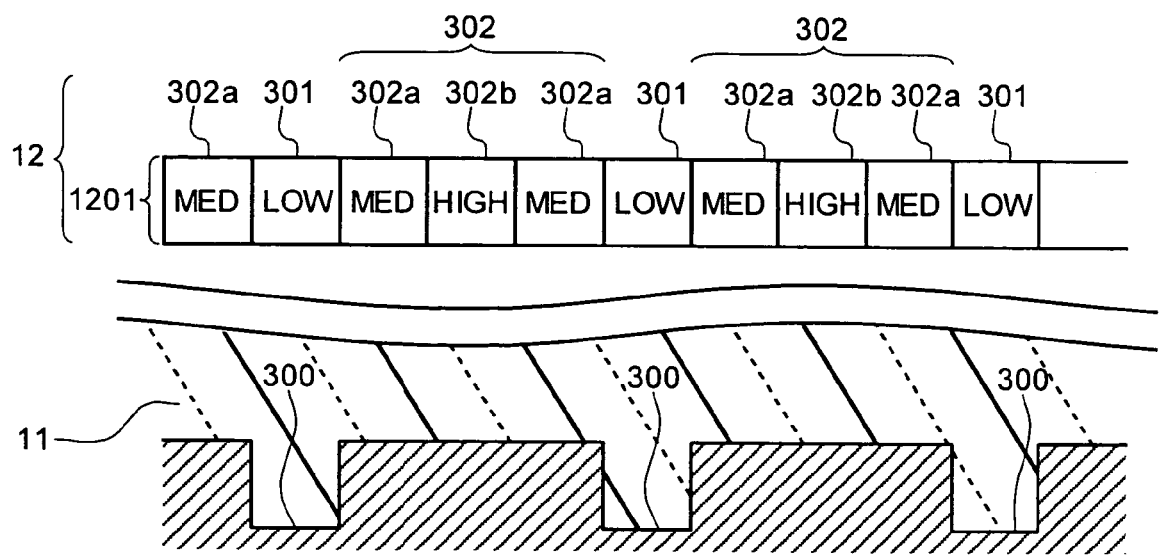
FIG. 3 is a cross-section of a neighborhood of a recording layer in an optical information recording medium according to a modification of the embodiment.
Figure 4:
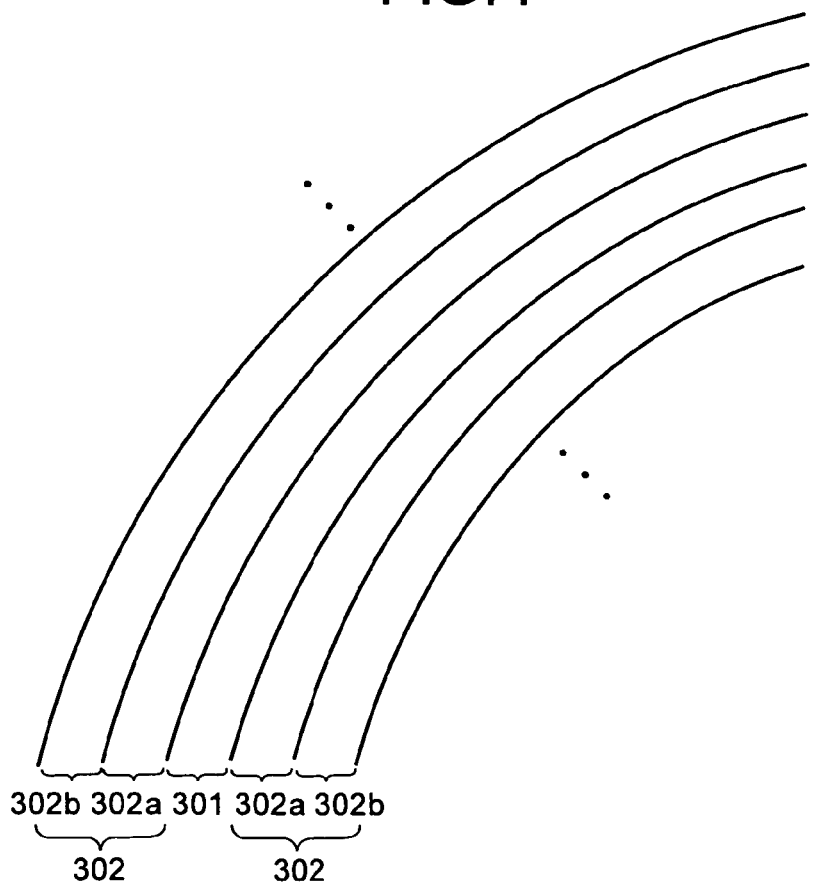
FIG. 4 is a plan view of a depth portion of the recording layer in the optical information recording medium according to the modification.

Therefore, as shown in FIG. 3 and FIG. 4, if regions 301 each corresponding to the groove 300 in the recording layer 12 are compared with regions 302 other than the regions 301, the regions 301 corresponding to the respective grooves 300 are irradiated with light larger in quantity than the light irradiated onto the regions 302. To be specific, the region farther from the region 301 corresponding to the groove 300 is irradiated with the light with a lower optical energy. Taking this into account, the recording layer 12 may be constituted to satisfy a relation, K1<K2<K3, where K1 is an optical density of a certain depth portion 1201 in the region 301 corresponding to the groove 300, K2 is an optical density of a certain depth portion 1201 in the region 302a outside of the region 301, and K3 is an optical density of a certain depth portion 1201 in the region 302b farthest from the region 301.

That is, it suffices that the optical densities K1, K2, and K3 at the same depth in the respective regions has the above relation. Alternatively, the recording layer may be constituted so as to smoothly change the optical density without setting different optical densities among the respective regions. For instance, the optical density in a certain region is higher as the region is farther from the region 301 corresponding to the groove 300. "LOW", "MED", and "HIGH" in FIG. 3 indicate degrees of optical density.

A method of manufacturing the optical information recording medium including the recording layer having different optical densities in the depth direction will next be explained with reference to FIGS. 5 to 7. As shown in FIG. 5, as for the recording layer having different optical densities in the depth direction, a film having a low optical density is formed on a surface of the transparent substrate opposite to the reflection layer (at a step Sa1) and a film having a high optical density is formed on the low optical density film (at a step Sa2). If three or more films having different optical densities are then to be formed, a step of forming a film having a higher optical density is repeatedly executed. After forming the recording layer by sequentially stacking the films in a descending order of optical density, a necessary step similar to that executed when optical information is recorded in the optical information recording medium for ordinary holographic recording is executed (at a step Sa3). The optical information recording medium can be thus manufactured.

In stacking, either a wet or dry method may be used. If the optical information recording medium is an organic photorefractive medium, the optical density of the recording layer can be controlled by changing the content of the charge generator contained in the recording layer. If the recording layer is made of a photopolymer, the optical density of the recording layer can be controlled by changing the content of the initiator or sensitizer contained therein. Namely, to manufacture the optical information recording medium including the recording layer made of a organic photorefractive material, the stacked films having different optical densities may be formed so as to satisfy the relationship of K1<K2<K3 while controlling the content of the charge generator. To manufacture the optical information recording medium including the recording layer made of a photopolymer, the stacked films having different optical densities may be formed so as to satisfy this relationship while controlling the content of the initiator or the sensitizer. The higher the content of the initiator is, the higher the optical density becomes.

FIG. 6 is a flowchart of another method of manufacturing the optical information recording medium including the recording layer having different optical densities in the depth direction. The recording layer having a uniform optical density is formed on the surface of the transparent substrate opposite to the reflection layer (at a step Sb1). Thereafter, the recording layer may be irradiated with a light at a wavelength that decreases the optical density from the substrate side (at a step Sb2) so as to decrease the optical density of the recording layer on the substrate side. A necessary step similar to that executed when optical information is recorded in the optical information recording medium for ordinary holographic recording is executed (at a step Sb3). The optical information recording medium can be thus manufactured. The wavelength for decreasing the optical density can be selected according to a spectrum of the sensitivity of the recording layer. If the recording layer is made of, for example, a photopolymer sensitive to a blue color, an ultraviolet light at a wavelength of about 380 nanometers to a visible light at a wavelength of about 400 nanometers can be used.

Figure 7:
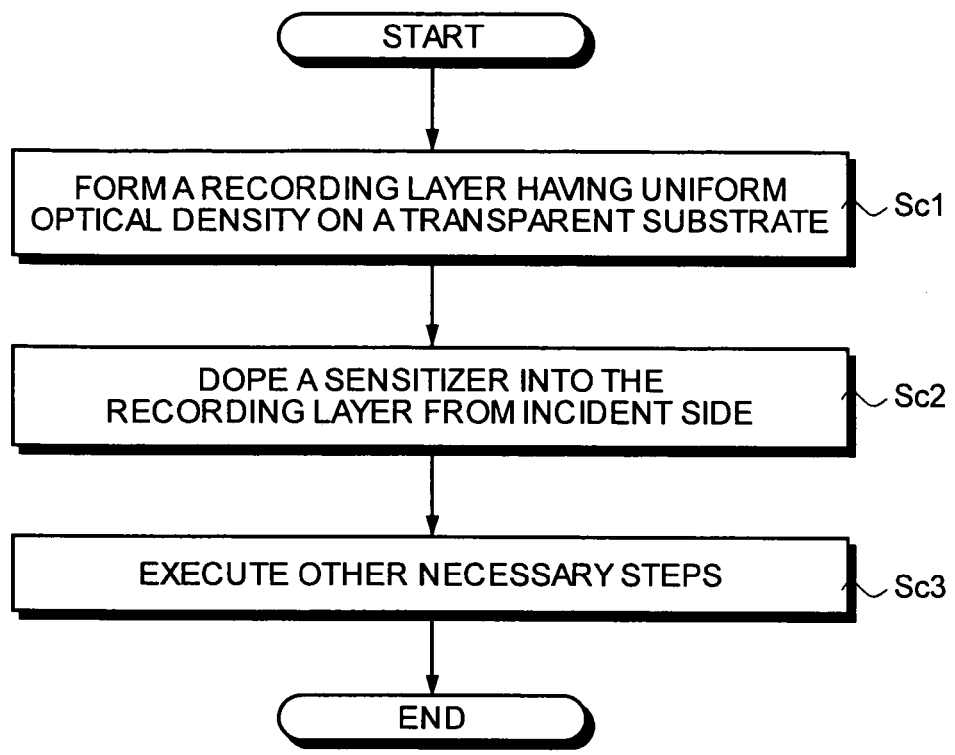
FIG. 7 is a flowchart of still another example of procedures for the method of manufacturing the optical information recording medium according to the embodiment.

FIG. 7 is a flowchart of still another method of manufacturing the optical information recording medium. As shown in FIG. 7, the recording layer having a uniform optical density is formed on the surface of the transparent substrate opposite to the reflection layer (at a step Sc1). The sensitizer is then impregnated into the recording layer from the light incident side (at a step Sc2). A necessary step similar to that executed when optical information is recorded in the optical information recording medium for ordinary holographic recording is executed (at a step Sc3). The optical information recording medium can be thus manufactured. As the sensitizer, the sensitizing pigment, the polymerization initiator, and the like can be used.

Furthermore, the medium having the optical density changed according to light beam irradiation conditions with the stacked films equal in depth (e.g., the medium including the recording layer shown in FIG. 3 and FIG. 4) can be manufactured by the following method. For example, after forming the recording layer having the uniform optical density, the region the optical density of which is to be decreased (the region 301 shown in FIGS. 3 and 4) is irradiated with the light at the wavelength that decreases the optical density. Alternatively, the initiator may be selectively impregnated into the region the optical density of which is to be increased (the region 302 shown in FIG. 3 and FIG. 4).

Information is recorded in the optical information recording medium according to this embodiment of the present invention by the holographic recording. In the holographic recording, two lights are used; one is the signal light to which information is added and the other is the reference light. In addition, interference fringes generated between the signal light and the other light (reference light) are recorded in the medium. As a result, an optical path difference occurs between the two lights. If a coherence length for the two lights is small, no interference fringes are generated. It is, therefore, preferable to employ a laser that provides a larger coherence length than the optical path difference. If the medium is applied to an ordinary computer terminal, a video editing machine, a database memory, or the like, the optical path difference in the apparatus is considered to be about one centimeter or more. Therefore, a gas laser or a semiconductor laser, particularly, a semiconductor laser that provides a larger coherence length by feedback control is preferable for a light source.

The present invention is explained in more detail in the exemplary embodiments as well as comparative examples. In a first embodiment of the present invention, the respective components are dissolved in toluene according to the following prescription to prepare three types of toluene solutions.

(Solution A)
  Charge generation material: 0.2 wt % diethyl-1,2-methano (60)-fullerene-61,61-dicarboxylate
  Charge transport material: 30.0 wt % N,N'-diphenyl-N,N'-(2-naphthyl)-(1.1'-phenyl)-4,4''-diamine
  Trap material: 10.0 wt % N,N'-diphenyl-N,N'-(2-naphthyl)-(p-terphenyl)-4,4''-diamine
  Nonlinear optical material: 40.0 wt % [[4-(dimethylamino)phenyl]-methylene]-2-methyl-4-nitrobenzene amine
  Polystyrene: 19.8 wt %

(Solution B)
  The solution B is prepared according to the same prescription as that for the solution A except that a mixture amount of the charge generation material is reduced to 0.15 wt % and that of the polystyrene is increased to 19.85 wt %.

(Solution C)
  The solution C is prepared according to the same prescription as that for the solution A except that a mixture amount of the charge generation material is reduced to 0.1 wt % and that of the polystyrene is increased to 19.9 wt %.

Since the solutions A, B, and C differ in the content of the charge generation material, it is possible to manufacture resin layers having different optical densities by using these solutions, respectively. The solution A has the highest content of the charge generation material and the solution C has the lowest. Therefore, the resin layer formed using the solution A has the highest optical density and the resin layer formed using the solution C has the lowest optical density.

Figure 8:
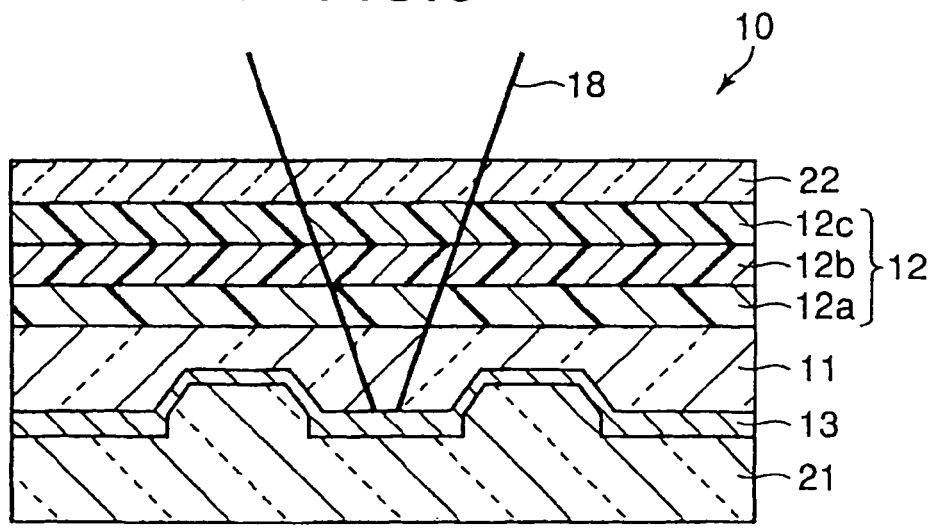
FIG. 8 is a cross-section of the optical recording medium according to the embodiment.

Using the solutions thus obtained, the optical information recording medium 10 illustrated in FIG. 8 is manufactured.

AgNdCu is deposited on a groove-side surface of the transparent substrate 11 (made of polycarbonate and having a thickness of 600 micrometers) that includes the grooves on one surface, by sputtering to thereby form a reflection film 13 having a thickness of 200 nanometers. A transparent film 21 (made of $SiO_2$ and having a thickness of 100 nanometers) is formed on the reflection film 13 by sputtering.

The solution C (having low optical density) is cast onto the transparent substrate 11 and the resultant substrate is dried for one hour at 70 degrees using a drier, thereby forming a first resin layer 12a. The solution B is then cast onto the first resin layer 12a and the resultant substrate is similarly dried for one hour at 70 degrees, thereby forming a second resin layer 12b.

The solution C is cast onto the second resin layer 12b and the resultant substrate is dried, similarly to the solutions A and B, for one hour at 70 degrees and then dried for ten hours at 100 degrees, thereby forming a third resin layer 12c.

As a result, the recording layer 12 having the first resin layer 12a, the second resin layer 12b, and the third resin layer 12c sequentially stacked in the descending order of optical density and having a thickness of 200 micrometers is formed on the transparent substrate 11.

Thereafter, while the resultant substrate is heated at 120 degrees, a polycarbonate protection film 22 having a thickness of 100 micrometers is thermally compressed onto the substrate from above, thereby obtaining the optical information recording medium 10.

A cross section of the optical information recording medium 10 is observed by a scanning electron microscope (SEM) to find that the first resin layer 12a has a thickness of 60 micrometers, the second resin layer 12b has a thickness of 70 micrometers, and the third resin layer 12c has a thickness of 70 micrometers.

Meanwhile, using the solutions C, B, and A solely, the first, the second, and the third resin layers 12a, 12b, and 12c are formed, respectively, and optical densities of the resin layers are measured by measuring absorptions thereof. As a result, if the optical density of the first resin layer 12a formed using the solution C for a light at a wavelength of 532 nanometers is α, that of the second resin layer 12b is 1.5 α and that of the third resin layer 12c is 2 α. In addition, the first, the second, and the third resin layers equally have a refractive index of 1.50.

Figure 9:
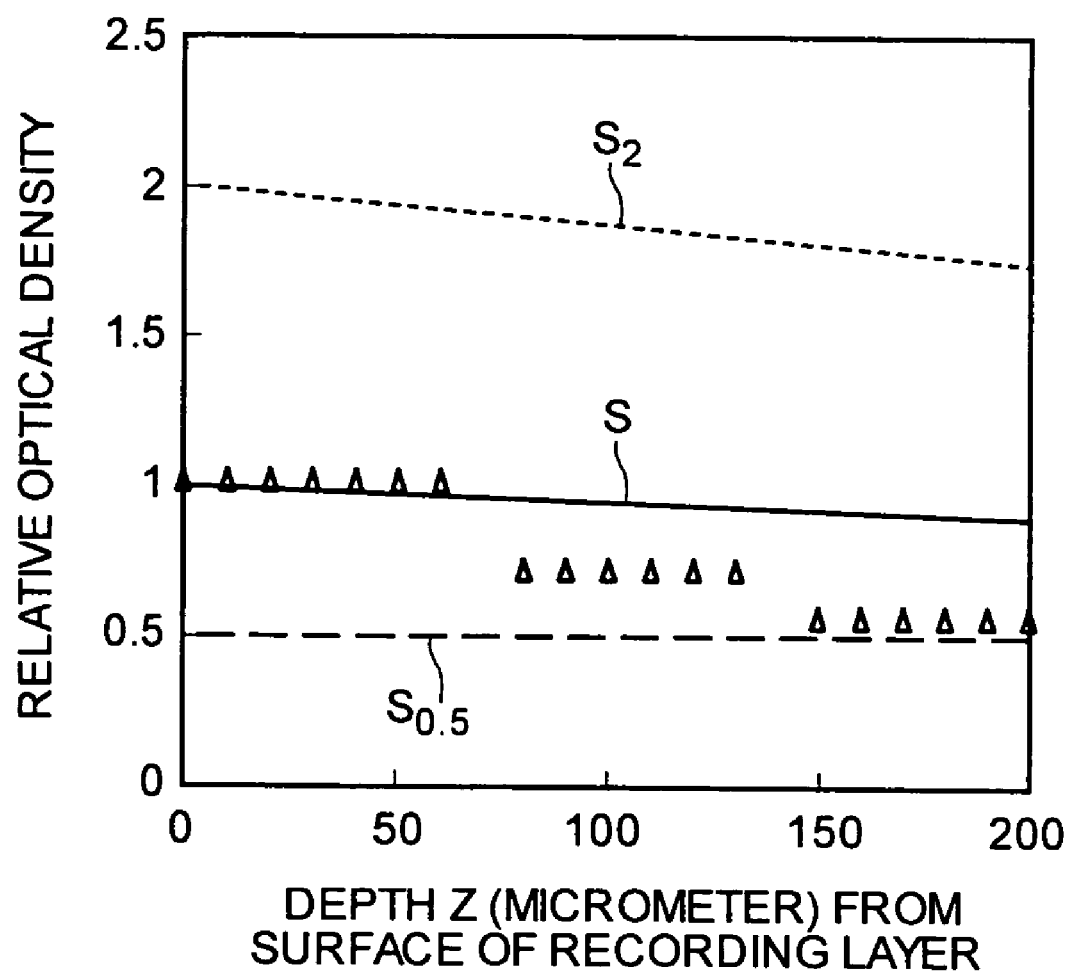
FIG. 9 is a graph of a depth-direction distribution of an optical density of the recording layer in the optical recording medium according to a first embodiment of the present invention.

Based on the thicknesses of the three resin layers 12a, 12b, and 12c that constitute the recording layer 12 and the optical densities thereof, the optical densities of the recording layer 12 in the optical information recording medium 10 manufactured in this embodiment are plotted as shown in the graph of FIG. 9.

Further, based on the relation (1), the optical density $S(z)$ at the depth z (in micrometers) from the incident surface of the recording layer 12 is calculated, the calculated optical density is standardized, and $S(z)/S(0)$ is also shown in FIG. 9 as a curve S. The numerical aperture (A) of the lens is 0.6 as set in the apparatus explained later. The radius (r0) of a beam on the incident surface of the recording layer 12 is 600 micrometers. In the graph of FIG. 9, a curve obtained by multiplying $S(z)/S(0)$ by 0.5 is denoted as a curve $S_{0.5}$ and that obtained by multiplying $S(z)/S(0)$ by 2 is denoted as a curve $S_2$. The optical densities of the recording layer fall within the range expressed by the relation (1).

The optical information recording medium 10 thus obtained is evaluated using the following apparatuses.

Figure 10:
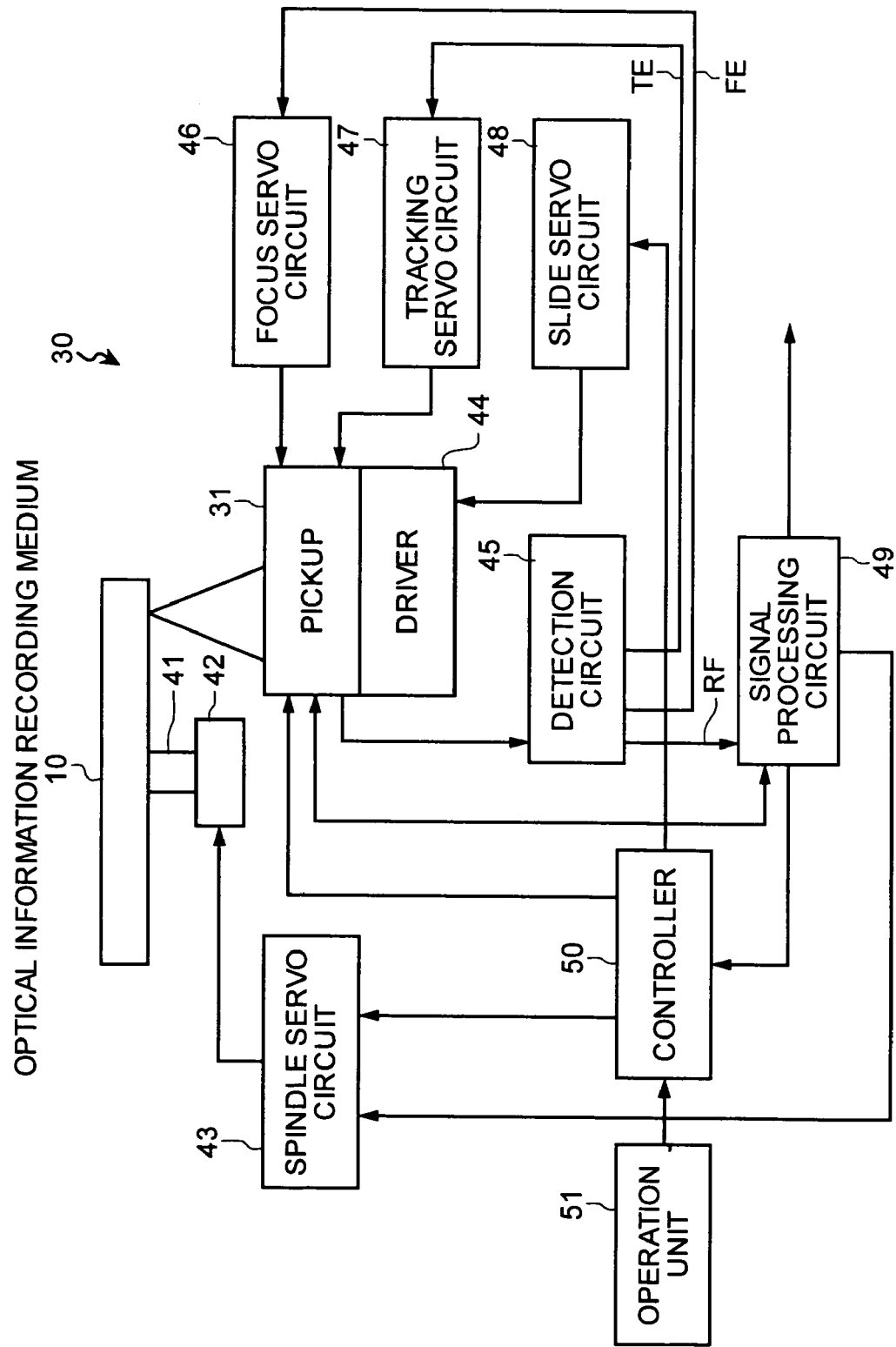
FIG. 10 is a schematic diagram of an apparatus for optical information recording and reading that records the information on and reads the information from the optical information recording medium according to the present invention.

FIG. 10a schematic diagram of an apparatus for optical information recording and reading that records the information on and reads the information from the optical information recording medium, employed to evaluate the optical information recording medium 10 thus manufactured. This optical information recording and reproduction apparatus 30 includes a spindle 41 to which the optical information recording medium 10 is attached, a spindle motor 42 that rotates this spindle 41, and a spindle servo circuit 43 that controls the spindle motor 42 so as to keep the number of rotations of the optical information recording medium 10 at a predetermined value.

The optical information recording and reproduction apparatus 30 also includes a pickup 31 that irradiates the optical information recording medium 10 with a signal light and a recording reference light to record information, irradiates the optical information recording medium 10 with a reproduction reference light to detect a read light, and that reproduces the information recorded in the optical information recording medium 10, and a driver 44 that drives the pickup 31 to be movable in a radial direction of the optical information recording medium 10.

The optical information recording and reproduction apparatus 30 further includes a detection circuit 45 that detects a focus error signal FE, a tracking error signal TE, and a reproduced signal RF based on an output signal of the pickup 31, a focus servo circuit 46 that drives an actuator in the pickup 31 based on the focus error signal FE detected by the detection circuit 45 to move an object lens in a thickness direction of the optical information recording medium 10 and that conducts focus servo control, a tracking servo circuit 47 that drives the actuator in the pickup 31 based on the tracking error signal TE detected by the detection circuit 45 to move the object lens in the radial direction of the optical information recording medium 10 and that conducts tracking servo control, and a slide servo circuit 48 that controls the driver 44 based on the tracking error signal TE a command from a controller and conducts slide serve control to move the pickup 31 to move in the radial direction of the optical information recording medium 10.

The optical information recording and reproduction apparatus 30 further includes a signal processing circuit 49 that decodes output data of a charge coupled device (CCD) array in the pickup 31. The signal processing circuit 49 decodes the output data of the CCD array, and reproduces data recorded in a data area of the optical information recording medium 10, reproduces a basic clock based on the reproduced signal RF from the detection circuit 45, or discriminates an address. Moreover, the optical information recording and reproduction apparatus 30 includes the controller 50 that controls entirety of the optical information recording and reproduction apparatus 30 and an operation section 51 that issues various commands to the controller 50. The basic clock and address information output from the signal processing circuit 49 are input to the controller 50. Using the input information, the controller 50 controls the pickup 31, the spindle servo circuit 43, the slide servo circuit 48, etc.

The spindle servo circuit 43 inputs the basic clock output from the signal processing circuit 49. The controller 50 includes a central processing unit (CPU), a read-only memory (ROM), and a random-access memory (RAM). The CPU executes a program stored in the ROM using the RAM as an operation area, whereby functions of the controller 50 are realized.

As shown in FIG. 1, the pickup 31 converges and irradiates the signal light 18 and the reference light 19. The optical information recording and reproduction apparatus 30 employs a laser at a wavelength of 532 nanometers and a power of 50 milliwatts as a light source. The polarized beam splitter 16 and the gyrator 15 are introduced, whereby the signal light 18 incident on the recording layer 12 and the reference light 19 passed through the recording layer 12 and reflected by the reflection layer 13 interfere with each other. At the same time, the reference light incident on the recording layer 12 and the signal light passed through the recording layer 12 and the reflected by the reflection layer 13 interfere with each other.

In the optical information recording and reproduction apparatus 30, when a laser light is converged, a diameter of a beam on the incident surface of the recording layer 12 is 1200 micrometers and that of a beam on the substrate-side surface of the recording layer 12 is 900 micrometers.

Light is irradiated while shifting an irradiation location by five micrometers apiece and different pieces of information are recorded in the optical information recording medium 10 manufactured as explained above by shift-multiplexing recording. Thereafter, the laser power is reduced to one-tenth and a content of the recorded information is reproduced.

As a result, the optical information recording and reproduction apparatus 30 can reproduce the information with a high accuracy of a bit error rate of $10^{-5}$ or less. This demonstrates that information can be recorded in the optical information recording medium in this embodiment using the laser at the power as low as five milliwatts.

An optical information recording medium for a first comparative example is manufactured by the same method as that in the first embodiment except that the recording layer 12 having a thickness of 200 micrometers is formed using only the solution C.

The manufactured optical information recording medium is evaluated similarly to the first embodiment. If a laser at a power of 50 milliwatts is employed, it takes three times as long as the time in the first embodiment to record reproducible information. After recording information using a laser at a power of 150 milliwatts, information reproduction is tried. Even if the optical information recording medium is irradiated with a laser light at a power as low as 0.5 milliwatts, the information recording and reproduction apparatus cannot reproduce the information. However, the apparatus can reproduce the information if the power of the laser is increased to 1.5 milliwatts. Nevertheless, a bit error rate is as low as $10^{-3}$.

The optical information recording medium according to a second embodiment of the present invention is explained. In the second embodiment, the recording layer is formed using the photopolymer. The photopolymer prepared based on Document (M. L. Schilling, et al: Chem Matter, 1999, 11, 247-254) is used. Solutions D, E, F, and G shown below are prepared first.

(Solution D)
  25 wt % isobornyl acrylate monomer (IBA)
  10 wt % vinyl naphthoate monomer (VNA)
  62.83 wt % di(urethane acrylate) oligomer
  2.0 wt % bis(2,4-cyclopentadiene-1-yl)bis[2,6-difluoro-3-3(1H-pyrrolyl)phenyl]titanium (Initiator)
  0.17 wt % tert-butyl hydroxyl peroxide (TBHP)
  These materials are contained in a brown bottle and stirred by a magnetic stirrer, thereby obtaining the solution D.

(Solution E)
  The solution E is prepared according to the same prescription as that for the solution D except that a mixture amount of the oligomer is increased to 63.33 wt % and that of the initiator is reduced to 15 wt %.

(Solution F)
  The solution F is prepared according to the same prescription as that for the solution D except that the mixture amount of the oligomer is increased to 63.63 wt % and that of the initiator is reduced to 12 wt %.

(Solution G)
  The solution G is prepared according to the same prescription as that for the solution D except that a mixture amount of the oligomer is increased to 64.03 wt % and that of the initiator is reduced to 0.8 wt %.

Since the solutions D, E, F, and G differ in the content of the initiator, it is possible to manufacture resin layers having different optical densities by using these solutions, respectively. The solution D has the highest content of the initiator and the solution G has the lowest. Therefore, the resin layer formed using the solution D has the highest optical density and the resin layer formed using the solution G has the lowest optical density.

Using the solutions thus obtained, the optical information recording medium 10 is manufactured by the following method.

The solution G is cast onto a transparent glass plate (having a thickness of 600 micrometers) and left in the dark for two hours, thereby forming the first resin layer. On a rear surface of the transparent glass substrate used here, pre-grooves are formed and a reflection film made of Au and having a thickness of 200 nanometers is formed.

Using the solutions F and E, the second and the third resin layers are sequentially formed on the first resin layer under the same conditions as those in the first embodiment. The solution D is cast onto the third resin layer, a transparent quartz substrate having a thickness of 0.5 millimeter is mounted on the third layer, and the resultant substrate is left for 24 hours, thereby forming a fourth resin layer.

As a result, the recording layer 12 having the first, the second, the third, and the fourth resin layers sequentially stacked in the descending order of optical density and having a thickness of 400 micrometers is formed on the transparent glass substrate. A cross section of the recording layer 12 is observed by the SEM to find that the respective resin layers have a thickness of 100 micrometers.

Meanwhile, using the solutions G, F, E, and D solely, the first, the second, the third, and the fourth resin layers are formed, respectively, and optical densities of the resin layers are measured by measuring absorptions thereof. As a result, if the optical density of the fourth resin layer formed using the solution D for the light at the wavelength of 532 nanometers is a, that of the third resin layer is 0.75 $\alpha$, that of the second resin layer is 0.6 $\alpha$, and that of the first resin layer is 0.4 $\alpha$. In addition, the first, the second, the third, and the fourth resin layers equally have a refractive index of 1.50.

Figure 11:
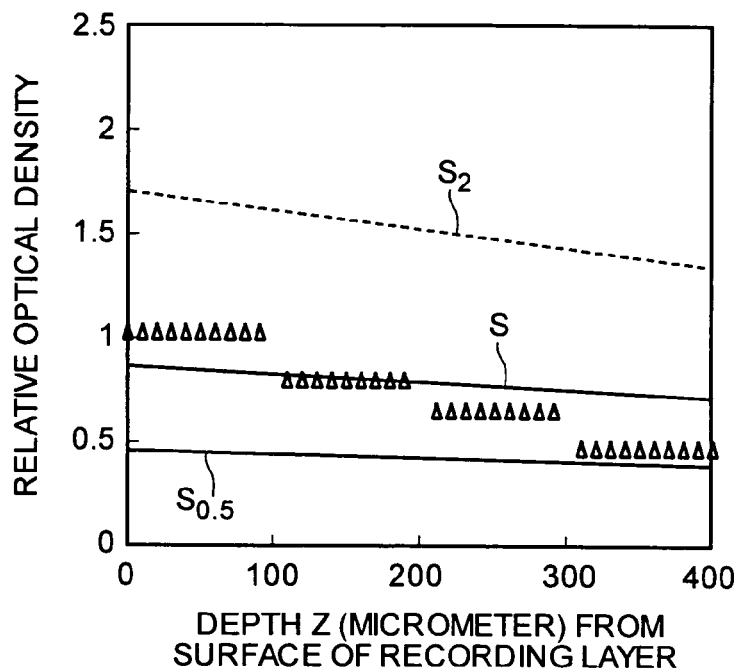
FIG. 11 is a graph of a depth-direction distribution of the optical density of a recording layer in an optical information recording medium according to a second embodiment of the present invention.

Based on the thicknesses of the four resin layers that constitute the recording layer 12 and the optical densities thereof, the optical densities of the recording layer 12 in the optical information recording medium manufactured in this embodiment are plotted as shown in the graph of FIG. 11.

Further, based on the relation (1), the optical density S(z) at the depth z (in micrometers) from the incident surface of the recording layer 12 is calculated, the calculated optical density is standardized, and S(z)/S(0) is also shown in FIG. 11 as the curve S. The numerical aperture (A) of the lens is 0.6 as set in the apparatus explained later. The radius (r0) of a beam on the incident surface of the recording layer 12 is 600 micrometers. In the graph of FIG. 11, a curve obtained by multiplying S(z)/S(0) by 0.5 is denoted as the curve $S_{0.5}$ and that obtained by multiplying S(z)/S(0) by 2 is denoted as the curve $S_2$. The optical densities of the recording layer fall within the range expressed by the relation (1).

The optical information recording medium thus obtained is evaluated using the same apparatus as that used in the first embodiment.

In the optical information recording and reproduction apparatus, when a laser light is converged, a diameter of a beam on the incident surface of the recording layer 12 is 1200 micrometers and that of a beam on the substrate-side surface of the recording layer 12 is 900 micrometers. Different pieces of information are recorded in the optical information recording medium by shifting the irradiation location by ten micrometers apiece by shift-multiplexing recording. Thereafter, the laser power is reduced to one-tenth and a content of the recorded information is reproduced.

As a result, the optical information recording and reproduction apparatus can reproduce the information with a high accuracy of a bit error rate of $10^{-5}$ or less. This demonstrates that information can be recorded in the optical information recording medium in this embodiment using the laser at the power as low as 12 milliwatts.

An optical information recording medium for a second comparative example is manufactured by the same method as that in the second embodiment except that the recording layer 12 having a thickness of 400 micrometers only using the solution F.

The manufactured optical information recording medium is evaluated by the same optical recording and reproduction apparatus. If the laser at a power of 50 milliwatts is employed, it takes five times as long as the time in the second embodiment to record reproducible information. Therefore, after recording information using the laser at a power of 150 milliwatts, information reproduction is tried. Even if the optical information recording medium is irradiated with a laser light at a power as low as 0.5 milliwatt, the information recording and reproduction apparatus cannot reproduce the information. However, the apparatus can reproduce the information if the power of the laser is increased to 1.5 milliwatts. Nevertheless, a bit error rate is as low as $3\times10^{-3}$.

An optical information recording medium according to a third embodiment of the present invention will be explained. A solution H is prepared according to the same prescription as that for the solution D except that a mixture amount of oligomer is changed to 57.83 wt % and 5.0 wt % of N-vinyl pyrrolidine (NVP) is added as a monomer component. Using the obtained solutions, the optical information recording medium is manufactured as follows.

A monomer NVP polymerized by the initiator is mixed into the solution H. By irradiating the recording layer with a light at a wavelength of 405 nanometers, it is possible to give gradients of optical densities.

AgNdCu is deposited on a groove-side surface of a transparent plastic substrate (having a thickness of 1.0 millimeter) that includes the grooves on one surface, by sputtering to thereby form a reflection film having a thickness of 200 micrometers. A transparent substrate (manufactured by JSR Arton, having a thickness of 500 micrometers) is bonded on the reflection film by thermal compression.

A Teflon sheet (having a thickness of 200 micrometers) serving as a spacer is arranged on an end portion of a surface of the transparent plastic substrate and the prepared materials are dropped into the sheet. Further, a transparent plastic plate (having a thickness of 1.0 millimeter) serving as a protection film is mounted on the resultant substrate, fixed thereto by a clip, and left for 24 hours. As a result, the optical information recording medium having a thickness of 400 micrometers is formed.

A light at a wavelength of 405 nanometers is irradiated from an LED onto the surface of the recording layer. An optical power density is set at 2 mW/cm$^2$ and irradiation time is set at five seconds. By irradiating the light, the initiator is activated and gradients of optical densities are provided in the recording layer so that the optical density is higher on an irradiation side.

Meanwhile, in order to measure the optical densities, four films each having a thickness of 100 micrometers are formed separately using the solution H.

While the four films obtained are stacked and the same transparent plastic plate as that explained above is provided on the stacked films, the stacked films are irradiated with a light under the same conditions as those for the recording layer. As a result, if the optical density of the lowermost film is a, those of the films higher than the lowest film sequentially increase to 1.5 α, 2.0 α, and 3 α, respectively. The four films equally have a refractive index of 1.50.

Figure 12:
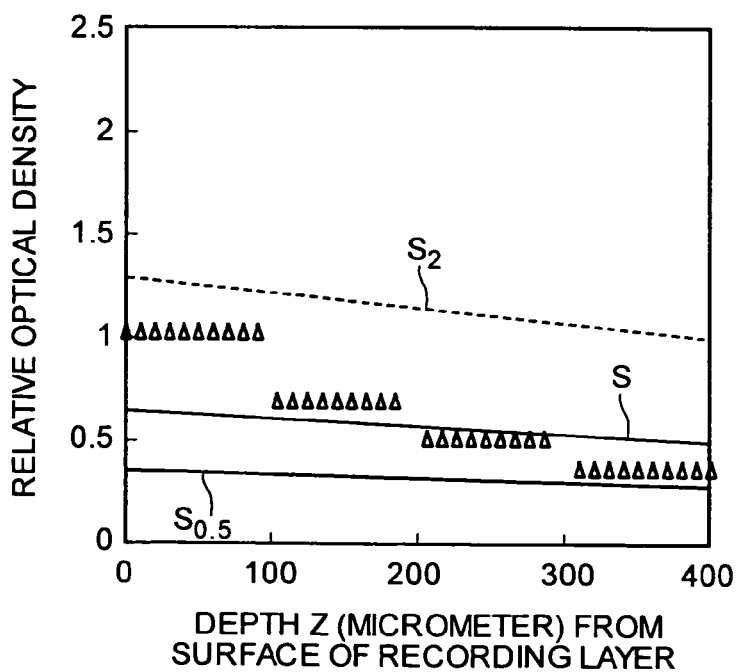
FIG. 12 is a graph of a depth-direction distribution of the optical density of a recording layer in an optical information recording medium according to a third embodiment of the present invention.

The optical densities of the recording layer in the optical information recording medium manufactured in this embodiment are plotted as shown in the graph of FIG. 12.

Further, based on the relation (1), the optical density S(z) at the depth z (in micrometers) from the incident surface of the recording layer 12 is calculated, the calculated optical density is standardized, and S(z)/S(0) is also shown in FIG. 12 as the curve S. The numerical aperture (A) of the lens is 0.6 as set in the apparatus explained later. The radius (r0) of a beam on the incident surface of the recording layer 12 is 600 micrometers. In the graph of FIG. 12, a curve obtained by multiplying S(z)/S(0) by 0.5 is denoted as the curve $S_{0.5}$ and that obtained by multiplying S(z)/S(0) by 2 is denoted as the curve $S_2$. The optical densities of the recording layer fall within the range expressed by the relation (1).

The optical information recording medium thus obtained is evaluated using the same apparatus as that used in the preceding embodiments except that a laser at a wavelength of 532 nanometers and a power of ten milliwatts is employed.

In the optical information recording and reproduction apparatus, when a laser light is converged, a diameter of a beam on the incident surface of the recording layer is 1600 micrometers and that of a beam on the substrate-side surface of the recording layer is 1250 micrometers. Different pieces of information are recorded in the optical information recording medium by shifting the irradiation location by ten micrometers apiece by shift-multiplexing recording. Thereafter, the laser power is reduced to one-fifth and a content of the recorded information is reproduced.

As a result, the optical information recording and reproduction apparatus can reproduce the information with a high accuracy of a bit error rate of $10^{-5}$ or less. This demonstrates that information can be recorded in the optical information recording medium in this embodiment using the laser at the power as low as ten milliwatts.

An optical information recording medium for a third comparative example is manufactured by the same method as that in the third embodiment except that the content of the initiator is halved, the oligomer is increased by as much as the reduced initiator, and a blue light is not irradiated.

The manufactured optical information recording medium is evaluated by the same optical recording and reproduction apparatus. If a laser at a power of ten milliwatts is employed, it takes three times as long as the time in the third embodiment to record reproducible information. After recording information using the laser at a power of 150 milliwatts, information reproduction is tried. Even if the optical information recording medium is irradiated with a laser light at a power as low as 0.5 milliwatt, the information recording and reproduction apparatus cannot reproduce the information; however, the apparatus can reproduce the information if the power of the laser is increased to 1.5 milliwatts. Nevertheless, a bit error rate is as low as $3 \times 10^{-3}$.

An optical information recording medium according to a fourth embodiment of the present invention will be explained. A solution I is prepared according to the same prescription as that for the solution F except that the mixture amount of the oligomer is changed to 58.83 wt % and 5.0 wt % of N-vinyl pyrrolidine (NVP) is added as a monomer component. Using the obtained solutions, the recording layer having a thickness of 220 micrometers is manufactured by the same method as that in the third embodiment.

Thereafter, an optical system is selected so as to provide substantially the same profile as that of the beam during recording and a light at a wavelength of 405 nanometers is irradiated from the LED along grooves. At this time, an optical power density is set at 20 mW/cm² and irradiation time is set at 10 s/cm. By irradiating the light, the initiator is activated and the optical densities in the recording layer are reciprocals of the beam intensity profiles.

The optical density of the recording layer is within the range expressed by the relation (2). To be specific, the optical density at the depth z (100 micrometers) of the recording layer and at the distance r (100 micrometers) from the center of the signal light beam is S0 or 0.95. The numerical aperture (A) of the lens is set at 0.5. The radius of a beam on the upper surface of the recording layer is set at 600 micrometers.

The optical information recording medium thus obtained is evaluated using the same apparatus as that used in the preceding embodiments except that the laser at a wavelength of 532 nanometers and a power of 50 milliwatts is employed.

In the optical information recording and reproduction apparatus, when a laser light is converged, a diameter of a beam on the incident surface of the recording layer is 1200 micrometers and that of a beam on the substrate-side surface of the recording layer is 1038 micrometers. Different pieces of information are recorded in the optical information recording medium by shifting the irradiation location by ten micrometers apiece by shift-multiplexing recording. Thereafter, the laser power is reduced to one-tenth and a content of the recorded information is reproduced.

As a result, the optical information recording and reproduction apparatus can reproduce the information with a high accuracy of a bit error rate of $10^{-5}$ or less. This demonstrates that information can be recorded in the optical information recording medium in this embodiment using the laser at the power as low as 50 milliwatts.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical information recording medium comprising:
   a transparent substrate having a first surface and a second surface;
   a recording layer arranged on the first surface of the transparent substrate, wherein
   a hologram is recorded in the recording layer when a signal light and a reference light are incident from an incident side opposite to the transparent substrate,
   a region in the recording layer, in which the hologram is recorded, contains portions of differing optical density and is conical, and
   the optical density corresponding to the signal light in the region of the recording layer in which the hologram is recorded decreases from the incident side toward the transparent substrate; and
   a reflection layer arranged on the second surface of the transparent substrate; wherein
   the recording layer includes a high optical density layer and a low optical density layer corresponding to the signal light, and
   the high optical density layer is arranged on the incident side relative to the low optical density layer.

2. The optical information recording medium according to claim 1, further comprising:
   a groove that is arranged on the second surface of the transparent substrate to form a track,
   wherein at a same depth position of the recording layer, the optical density of an area of the recording layer corresponding to the groove is lower than the optical density of other area.

3. The optical information recording medium according to claim 1, further comprising:
   a groove that is arranged on the second surface of the transparent substrate to form a track,
   wherein the recording layer includes areas having different optical densities at a same depth position, and
   an area having a lower optical density is arranged at a nearer position to the groove than an area having a higher optical density.

4. The optical information recording medium according to claim 1, wherein the hologram is recorded in the recording layer by a polarized collinear holographic method.

5. The optical information recording medium according to claim 1, wherein the optical density S(z) at a depth z in the recording layer is within a range expressed as $$0.5 \times \frac{S_0}{r_0^2}\left(r_0 - \frac{\frac{A}{n_1}}{\sqrt{1-\left(\frac{A}{n_1}\right)^2}}z\right)^2 \leq S(z) \leq 2.0 \times \frac{S_0}{r_0^2}\left(r_0 - \frac{\frac{A}{n_1}}{\sqrt{1-\left(\frac{A}{n_1}\right)^2}}z\right)^2$$

where $S_0$ is the optical density on a surface of the incident side of the recording layer at z=0, $n_1$ is a refractive index of the recording layer, A is a numerical aperture of a lens, $r_0$ is a radius of a spot of the signal light on the surface of the incident side, and z is a distance from the surface of the incident side into the recording layer.

6. The optical information recording medium according to claim 1, further comprising:
   a groove that is arranged on the second surface of the transparent substrate to form a track, wherein
   the optical density S(r, z) at a predetermined position in the recording layer is within a range expressed as $$0.5 \times \frac{S_0}{r_0^2}\left(r_0 - \frac{\frac{A}{n_1}}{\sqrt{1-\left(\frac{A}{n_1}\right)^2}}z\right)^2 \exp\left(\frac{2r^2}{r_0^2}\right) \leq$$

$$S(r,z) \leq 2.0 \times \frac{S_0}{r_0^2}\left(r_0 - \frac{\frac{A}{n_1}}{\sqrt{1-\left(\frac{A}{n_1}\right)^2}}z\right)^2 \exp\left(\frac{2r^2}{r_0^2}\right)$$

where $S_0$ is the optical density of a center of a spot of the signal light at r=0 on a surface of the incident side of the recording layer at z=0, $n_1$ is a refractive index of the recording layer, A is a numerical aperture of a lens, $r_0$ is a radius of the spot of the signal light on the surface of the incident side, r is a distance from the center of the spot in a direction across the track, and z is a distance from the surface of the incident side into the recording layer.

7. The optical information recording medium according to claim 1, wherein the recording layer contains an initiator that absorbs light and initiates a polymerization reaction, and the initiator is bis (2,6-difluoro-3-pyrrole phenyl) titanocene.

8. The optical information recording medium according to claim 1, wherein the recording layer contains an initiator that absorbs light and initiates a polymerization reaction, and a content of the initiator is 0.1 to 5.0 Wt %.

9. An optical information recording medium comprising:
a transparent substrate having a first surface and a second surface;
a recording layer arranged on the first surface of the transparent substrate, wherein
   a hologram is recorded in the recording layer when a signal light and a reference light are incident from an incident side opposite to the transparent substrate,
   a region in the recording layer, in which the hologram is recorded, contains portions of differing optical density and is conical, and
   an optical density corresponding to the signal light in the region of a part of the recording layer in which the hologram is recorded decreases from the incident side toward the transparent substrate, and an optical density of a remaining part of the recording layer is uniform; and
a reflection layer arranged on the second surface of the transparent substrate;
wherein
   the recording layer includes a high optical density layer and a low optical density layer corresponding to the signal light, and
   the high optical density layer is arranged on the incident side relative to the low optical density layer.

10. The optical information recording medium according to claim 9, wherein the hologram is recorded in the recording layer by a polarized collinear holographic method.

11. An optical information recording medium comprising:
a transparent substrate having a first surface and a second surface;
a recording layer arranged on the first surface of the transparent substrate, wherein
   a hologram is recorded in the recording layer when a signal light and a reference light are incident from an incident side opposite to the transparent substrate,
   a region in the recording layer, in which the hologram is recorded, contains portions of differing optical density and is conical,
   the recording layer includes a high optical density layer and a low optical density layer corresponding to the signal light,
   the high optical density layer is arranged on the incident side relative to the low optical density layer, and
   the optical density corresponding to the signal light in the region of the recording layer in which the hologram is recorded decreases from the incident side toward the transparent substrate; and
a reflection layer arranged on the second surface of the transparent substrate.

12. The optical information recording medium according to claim 11,
wherein the hologram is recorded in the recording layer by a polarized collinear holographic method.

13. A method of recording information in an optical information recording medium, the method comprising:
selecting an optical information recording medium, the medium comprising:
   a transparent substrate having a first surface and a second surface;
   a recording layer arranged on the first surface of the transparent substrate,
   wherein
      a hologram is recorded in the recording layer when a signal light and a reference light are incident from an incident side opposite to the transparent substrate,
      a region in the recording layer, in which the hologram is recorded, contains portions of differing optical density and is conical, and
      an optical density corresponding to the signal light in the region of the recording layer in which the hologram is recorded decreases from the incident side toward the transparent substrate; and
   a reflection layer arranged on the second surface of the transparent substrate; and
recording the hologram in the recording layer by irradiating the optical information recording medium with the signal light and the reference light through a lens, wherein the optical density S(z) at a depth z in the recording layer is within a range expressed as $$0.5 \times \frac{S_0}{r_0^2}\left(r_0 - \frac{\frac{A}{n_1}}{\sqrt{1-\left(\frac{A}{n_1}\right)^2}}z\right)^2 \leq S(z) \leq 2.0 \times \frac{S_0}{r_0^2}\left(r_0 - \frac{\frac{A}{n_1}}{\sqrt{1-\left(\frac{A}{n_1}\right)^2}}z\right)^2$$

where $S_0$ is the optical density on a surface of the incident side of the recording layer at z=0, $n_1$ is a refractive index of the recording layer, A is a numerical aperture of the lens, $r_0$ is a radius of a spot of the signal light on the surface of the incident side, and z is a distance from the surface of the incident side into the recording layer.

14. The method of recording information in an optical information recording medium according to claim 13, wherein the hologram is recorded in the recording layer by a polarized collinear holographic method.

15. A method of recording information on an optical information recording medium, the method comprising:

selecting an optical information recording medium, the medium comprising:
- a transparent substrate having a first surface and a second surface;
- a recording layer arranged on the first surface of the transparent substrate,
- wherein
  - a hologram is recorded in the recording layer when a signal light and a reference light are incident from an incident side opposite to the transparent substrate,
  - a region in the recording layer, in which the hologram is recorded, contains portions of differing optical density and is conical, and
  - an optical density corresponding to the signal light in the region of the recording layer in which the hologram is recorded decreases from the incident side toward the transparent substrate, a reflection layer arranged on the second surface of the transparent substrate, and
- a groove that is arranged on the second surface of the transparent substrate to form a track; and recording the hologram in the recording layer by irradiating the optical information recording medium with the signal light and the reference light through a lens, wherein the optical density $S(r, z)$ at a predetermined position in the recording layer is within a range expressed as $$0.5 \times \frac{S_0}{r_0^2} \left( r_0 - \frac{\frac{A}{n_1}}{\sqrt{1 - \left(\frac{A}{n_1}\right)^2}} z \right)^2 \exp\left(\frac{2r^2}{r_0^2}\right) \leq$$

$$S(r, z) \leq 2.0 \times \frac{S_0}{r_0^2} \left( r_0 - \frac{\frac{A}{n_1}}{\sqrt{1 - \left(\frac{A}{n_1}\right)^2}} z \right)^2 \exp\left(\frac{2r^2}{r_0^2}\right)$$

where $S_0$ is the optical density of a center of a spot of the signal light at $r=0$ on a surface of the incident side of the recording layer at $z=0$, $n_1$ is a refractive index of the recording layer, $A$ is a numerical aperture of the lens, $r_0$ is a radius of the spot of the signal light on the surface of the incident side, $r$ is a distance from the center of the spot in a direction across the track, and $z$ is a distance from the surface of the incident side into the recording layer.

16. The method of recording information in an optical information recording medium according to claim 15, wherein the hologram is recorded in the recording layer by a polarized collinear holographic method.

* * * * *